UNITED STATES PATENT OFFICE.

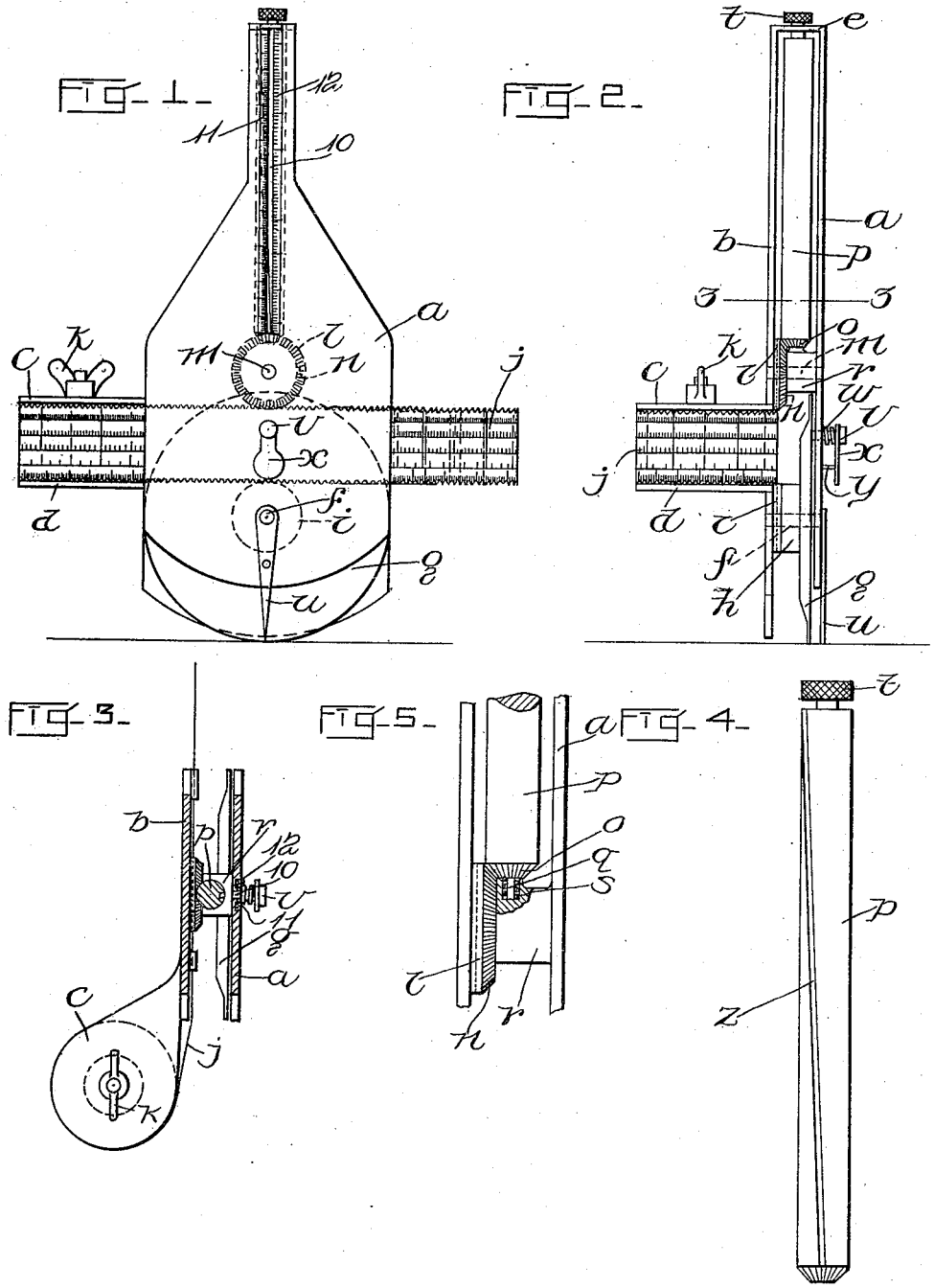

NATHANIEL A. STRATTON, OF MELROSE, MASSACHUSETTS, ASSIGNOR OF ONE-SIXTH TO WILLARD L. DAY, OF BOSTON, MASSACHUSETTS.

MEASURING INSTRUMENT.

1,296,566.      Specification of Letters Patent.      Patented Mar. 4, 1919.

Application filed June 14, 1915. Serial No. 33,862.

*To all whom it may concern:*

Be it known that I, NATHANIEL A. STRATTON, a citizen of the United States, and resident of Melrose, in the county of Middlesex and State of Massachusetts, have invented certain new and useful Improvements in Measuring Instruments, of which the following is a specification.

The object of the present invention is to provide an instrument by which may be measured exactly the length of lines, however irregular such lines may be and the boundaries of areas, giving indications in terms of the exact length of such lines or of a given fractional part thereof, and furnishing a basis for the calculation of areas embraced within such boundaries. Secondary objects and features of the invention relate to particular means of a simple and efficient character for giving the measurements and indications required. A further object is to provide a novel and improved fraction indicator by which to indicate micrometrically, or in other words, to show on an enlarged scale, fractional parts of the graduations or other indicating means of the primary indicator. The invention is embodied in a device having a disk or the like adapted to roll along the line, or about the boundaries of the area, which is to be measured, and is provided with means for driving an indicator, such indicator being preferably an inextensible tape sufficiently rigid to accomplish the desired purpose, as hereinafter explained. The exact nature of the invention and the construction of a particular instrument which I have devised embodying the invention appear from the following detailed description and in connection with the accompanying drawings, in which Figure 1 is a front view of the instrument.

Fig. 2 is a side view as seen from the left of Fig. 1.

Fig. 3 is a sectional plan view showing the parts below the line 3—3 of Fig. 2.

Fig. 4 is an elevation in detail of the fraction indicator.

Fig. 5 is a detail view showing the means for driving said fraction indicator.

The instrument here illustrated includes a frame consisting of a front plate $a$, a back plate $b$, and lugs or brackets $c$, $d$ projecting to the rear and to one side from the back plate. The front and back plates are connected at the top by a web $e$ in which is a bearing for the trunnion of the micrometric fraction indicator hereinafter described.

Between the front and back plates extends a pin $f$ which secures the lower parts of these plates at a given distance apart and also serves as the trunnion or pivot of a disk $g$, the rim of which extends somewhat below the lower limits of the frame. Said disk has a hub or sleeve $h$ to which is connected a toothed driving wheel $i$; the pin $f$ being so located and the disk and toothed wheel so proportioned that the rim of the wheel rises slightly above the lower bracket $d$. In this description I use the terms "horizontal", "vertical", "upper", "lower", "top", "bottom", and other terms indicating direction and relation, for the purpose of illustration merely and in the interest of brevity, such terms being applied with reference to the position in which the instrument is shown in the drawings and without limiting intention.

Between the lugs or brackets $c$ and $d$ is mounted a reel on which is rolled a tape $j$, said reel having a key or handle $k$ located above the upper bracket $c$ for turning it to wind up the tape. This tape passes from the reel between the front and back plates close to the latter and over the toothed wheel $i$. Its bottom edge is toothed or serrated to mesh with the teeth of the wheel and its upper edge is also toothed or serrated for the purpose of driving the fraction indicator, as will be presently described. The locations of the reel and of the toothed wheel $i$, and the width of the tape are so designed and arranged that the teeth of the tape and wheel will mesh properly without backlash.

A toothed wheel $l$ is mounted on a pivot pin $m$ close to the back plate $b$ above the tape and meshes with the teeth on the upper edge of the latter, serving the purpose of holding the lower line of teeth in mesh with the driving wheel. This wheel is formed in part as a bevel gear $n$, or in other words, associated with this wheel is a bevel gear element, which meshes with the complemental bevel gear $o$ of a fraction indicator $p$. Said indicator is a bar arranged vertically between the front and back plates, having a trunnion contained in a bearing of the web $e$, and having a reduced foot $q$, which enters a socket in a bracket *r* and is surrounded by a spring *s* contained in said bracket and pressing upwardly against the bottom of the bar. The bracket *r* extends rearwardly from the front plate *a* and contains the pivot pin *m*. Spring *s* is designed to lift the indicator bar so that its gear element *o* is normally out of mesh with the bevel gear element *n*, such gear elements being brought into mesh by pressure of the operator's finger against the head *t* on the indicator bar above the top of the frame.

I provide a stationary index *u*, which is mounted on the front plate *a* in a rigid manner, and extends to a point close to the rim of the disk *g*, such index being provided to show the tangential point of the disk on the line along which it is rolled. There is also a brake operable at will to secure the disk *g* against rotation. The brake here shown is a plunger *v* which passes through the front plate *a* and is supported in front of such plate by an arm *x*, the latter being connected with the plate by a brace or strut *y*. A spring *w* is interposed between the plate *a* and arm *x* and normally acts to withdraw the brake plunger *v* from the measuring disk. When it is desired to apply the brake, one of the digits of the user's hand holding the instrument is pressed against the head of the plunger and the latter is pressed inward, arm *x* being sufficiently flexible to permit movement of the plunger under this pressure.

The indicating element of the fraction indicator *p* is a groove or line *z* which is a helix of steep pitch and is exposed to view through a vertical slot 10 in the front plate. Adjacent to the edges of this slot are scales 11 and 12, which are preferably formed as removable slides, so that scales having different graduations may be substituted for one another. Rotation of the indicator bar exposes different points in the indicating helix *z* beside different graduations of the scale. The relatively great length of the indicator bar and the steep pitch of the helix cause slight angular movements of the bar to effect a comparatively great change in the relation of the helix to the scales, thereby enabling minute movements of the tape which drives the fraction indicator to be measured with great accuracy.

In operation, the frame of the instrument is grasped in the hand of the user in such a way that pressure is applied to the arm *x* to release brake *v*. The rim of the disk *g* is placed on the line to be measured and is rolled along such line, the operator changing the direction of its movement so as to follow exactly all the irregularities of such line, and to turn about angles in the line. The index *u* shows exactly when the tangential point of the disk reaches the apex of any angle and also when the starting point is reached in cases where the line followed makes a closed circuit. In thus traveling along the line measured, the disk rotates the wheel *i* and so propels the tape, causing it to be moved past the edges of the frame, any one of which edges may be used as an index for reading the graduations of the tape, or any other sort of index may be equally well provided for this purpose.

As the tape is propelled, it drives the wheel *l* and the fraction indicator *p*, when the latter is so placed that the bevel gear elements *o* and *n* mesh. I prefer that the fraction indicator should be held out of operation until the end of the line or circuit is nearly reached, to be then brought into operation when the distance remaining to be measured is less than the distance between two graduations on the tape; but the fraction indicator may equally well be caused to travel continuously, and the latter mode of operation may for some purposes be preferable to the other.

The tape which I employ is sufficiently stiff and rigid to be driven in the manner described and to transmit motion from the driving wheel *i* to the fraction indicator, and at the same time sufficiently flexible to be rolled up on a reel. Steel tapes of the kind used for surveying work have the balance between flexibility and stiffness required for my purpose and I may use tapes of this material. I may use also strips of other metallic or non-metallic substances possessing these qualities.

Any metallic or non-metallic substances suitable for the purpose may be used for making the other parts of the instrument.

This instrument being intended to be used for measuring the lines and areas of drawings and plans which may be drawn to various scales, I may provide a number of scales upon the tape as indicated in these drawings, to correspond with the scales of such plans, and I may also provide a number of substitute tapes graduated according to various scales. One reel may be substituted for another by simply removing the reel from between the brackets *c* and *d* and substituting another reel, passing the end of the tape between the wheels *i* and *l*. The fractional scales 11 and 12 are preferably also removable and replaceable to permit substitution of scales otherwise graduated, for the same purpose. As the driving wheel *i* is of smaller diameter than the disk *g*, the movement of the tape is a fractional part of the distance traversed by the disk, wherefore the graduations on the tape are spaced taking this proportion into account to give the readings required of the instrument.

It will be seen that the wheel *l* is a means for guiding the tape and by preventing it from rising retaining it in mesh with the driving wheel *i*, as well as being a medium for transmitting motion to the fraction indicator.

Various modifications may be made in the proportions and dimensions of the instrument. The one here is intended as a pocket instrument and is of such size that it may be carried in the pocket of the user. The frame may be designed otherwise than as here shown, in any form which will enable the instrument to be used most conveniently and to change the direction of its travel.

In this description I have explained the principles of construction and the mechanical mode of use of the instrument, without entering into a discussion of the mathematical results to be obtained by its use. Such results are determined by the character of scales used on the indicating tape and by calculations which may be made on the basis of the readings taken from such scales. The invention which I desire to protect by means of this application is that involved in the mechanism of the instrument, it being of course understood that I do not limit the invention to the precise construction or arrangement of such mechanism, or in any other wise than as expressly stated in the following claims.

What I claim and desire to secure by Letters Patent is:

1. A measuring instrument comprising a frame, a disk rotatably mounted on said frame and rotated by contact of its periphery with a surface over which the instrument is moved, a driving wheel connected to said disk, a reel mounted on said frame, and a tape bearing indicating graduations wound upon said reel, extending therefrom and being engaged with said wheel so that it will be propelled by rotation thereof.

2. A measuring instrument comprising a frame, a disk rotatably mounted on said frame, a toothed driving wheel connected with and operated by said disk, a tape mounted upon said frame and having teeth on one edge adapted to engage the teeth of the driving wheel, and a wheel bearing on the opposite edge of the tape for retaining said teeth in engagement with the wheel, the tape being constrained to move endwise.

3. A measuring instrument comprising a frame, a rotatable element adapted to contact with the surface over which the instrument is transported and to be rotated relatively to the frame thereby, an indicating tape connected for operation by said element and a fraction indicator driven by said tape, said rotatable element, tape, and fraction indicator being mounted on said frame.

4. A measuring instrument comprising a frame, a rotatable disk, a reel, both carried by said frame, a tape mounted upon said reel, means operated by rotation of the disk for propelling said tape, a fraction indicator, and means operated by the tape for moving said fraction indicator.

5. A measuring instrument comprising a frame, a measuring wheel mounted on said frame, an indicating tape supported by the frame and arranged to be moved endwise, means driven by rotation of said wheel for so moving said tape, a rotatable fraction indicator, and means operated by movement of said tape for rotating said fraction indicator.

6. A measuring instrument comprising a measuring wheel, an indicating tape arranged to be moved endwise, means driven by rotation of said wheel for so moving said tape, a rotatable fraction indicator, means operated by movement of said tape for rotating said fraction indicator, and such fraction indicator having a helical indicating element, and a fixed scale coöperating with said indicating element.

7. A measuring instrument comprising a frame, a measuring wheel carried by said frame, a rotatable indicating member having a helical indicating element of steep pitch, a relatively stationary index on the frame coöperating with said element, and driving means on the frame imparting rotation from said measuring wheel to said indicating member.

8. A measuring instrument comprising a frame having an elongated index portion, an indicating member mounted on the frame adapted to rotate on an axis parallel to said index portion, and having a helical indicating element, a measuring wheel rotatably mounted on said frame, and transmission mechanism driven by said wheel for rotating said indicating member.

9. A measuring instrument comprising a frame, a measuring wheel carried by said frame, a toothed driving wheel connected thereto, a graduated tape having its opposite edges serrated and supported by said frame, the serrations of one of said edges meshing with said driving wheel, a transmission toothed wheel mounted on said frame meshing with the serrations on the opposite edge of said tape and having a beveled gear element, a rotatable indicator bar mounted on said frame having a gear element meshing with the said bevel gear element and bearing an indicating helix, the frame having a relatively stationary index parallel to the axis of said indicating member.

In testimony whereof I have affixed my signature.

NATHANIEL A. STRATTON.

Copies of this patent may be obtained for five cents each, by addressing the "Commissioner of Patents, Washington, D. C."